United States Patent
Gilbert et al.

(10) Patent No.: US 10,781,843 B2
(45) Date of Patent: Sep. 22, 2020

(54) TOGGLE BOLT CATCH

(71) Applicants: Roderick Trampass Gilbert, Powder Springs, GA (US); Charles Edward Morgan, Jr., Villa Rica, GA (US); Samuel Leonard Eaton, Villa Rica, GA (US)

(72) Inventors: Roderick Trampass Gilbert, Powder Springs, GA (US); Charles Edward Morgan, Jr., Villa Rica, GA (US); Samuel Leonard Eaton, Villa Rica, GA (US)

(73) Assignees: Roderick Trampass Gilbert, Powder Springs, GA (US); Charles Edward Morgan, Villa Rica, GA (US); Samuel Leonard Eaton, Villa Rica, GA (US)

( * ) Notice: Subject to any disclaimer, the term of this patent is extended or adjusted under 35 U.S.C. 154(b) by 276 days.

(21) Appl. No.: 15/819,841

(22) Filed: Nov. 21, 2017

(65) Prior Publication Data
US 2019/0154068 A1 May 23, 2019

(51) Int. Cl.
*F16B 21/00* (2006.01)
*F16B 13/08* (2006.01)

(52) U.S. Cl.
CPC .............. *F16B 13/0808* (2013.01)

(58) Field of Classification Search
CPC .................................. F16B 13/0808
USPC ................................. 411/340–342
See application file for complete search history.

(56) References Cited

U.S. PATENT DOCUMENTS

| | | | | |
|---|---|---|---|---|
| 2,024,871 A | * | 12/1935 | Parsons | F16B 13/0808 411/342 |
| 2,950,141 A | * | 8/1960 | Koff | E05B 65/006 292/256.73 |
| 3,248,994 A | * | 5/1966 | Mortensen | F16B 13/0808 411/344 |
| 3,288,014 A | * | 11/1966 | Mortensen | F16B 13/0808 411/344 |
| 4,245,545 A | * | 1/1981 | Freeman | F16B 13/0808 411/29 |
| 4,822,226 A | * | 4/1989 | Kennedy | F16B 13/0808 411/340 |
| 4,997,327 A | * | 3/1991 | Cira | F16B 13/0808 411/340 |
| 6,062,785 A | * | 5/2000 | McDermott | F16B 13/061 411/344 |

(Continued)

*Primary Examiner* — Gary W Estremsky
(74) *Attorney, Agent, or Firm* — Thomas | Horstemeyer, LLP; Jason M. Perilla

(57) ABSTRACT

An example toggle bolt catch for use with a toggle bolt is described. The toggle bolt catch includes a collar eyelet and a toggle catch. The collar eyelet includes a cylindrical ring having a central opening to allow the toggle of a toggle bolt to pass through and a flange that extends radially outward from the cylindrical ring. The toggle catch includes a minor arc stem that extends away from a back of the cylindrical ring. In use, the toggle bolt catch is inserted through a hole formed in drywall, for example, with the minor arc stem extending in the open space behind the drywall. When the bolt of the toggle bolt is rotated, the toggle can rotate only until it contacts the minor arc stem, after which further rotation of the bolt will draw the toggle of the toggle bolt toward the bolt without additional rotation of the toggle.

20 Claims, 8 Drawing Sheets

(56) References Cited

U.S. PATENT DOCUMENTS

| | | | | |
|---|---|---|---|---|
| 6,250,865 B1* | 6/2001 | McSherry | ............ | F16B 13/0808 |
| | | | | 411/29 |
| 8,449,236 B2* | 5/2013 | McDuff | .............. | F16B 13/0808 |
| | | | | 411/344 |
| 8,567,151 B2* | 10/2013 | Walther | .................. | E04B 1/003 |
| | | | | 52/223.13 |

* cited by examiner

TOGGLE BOLT CATCH

BACKGROUND

It can be helpful to screw or nail directly into a wall stud when securing items to a wall. However, studs are rarely positioned at the locations desired to secure items directly to them. In those situations, anchors can be used to secure items to a wall. Anchors are designed to securely attach and distribute weight to drywall (e.g., plasterboard, wallboard, gypsum panel, sheet rock, gypsum board, etc.), wood and composite paneling, cement board, and other types of wall panels. Anchors can also be relied upon to secure items to steel studs where used in place of wood studs for construction.

Wall anchors come in a range of styles and sizes for use with different types of materials and for different types of construction. Examples of different anchors include cement board screw anchors, expansion anchors, hollow wall anchors, hollow wall plugs, plastic threaded anchors, winged plastic anchors, and toggle bolts, among others.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As noted above, wall anchors come in a range of styles and sizes for use with different types of materials and for different types of construction. Examples of different anchors include cement board screw anchors, expansion anchors, hollow wall anchors, hollow wall plugs, plastic threaded anchors, winged plastic anchors, and toggle bolts, among others.

Figure 1:
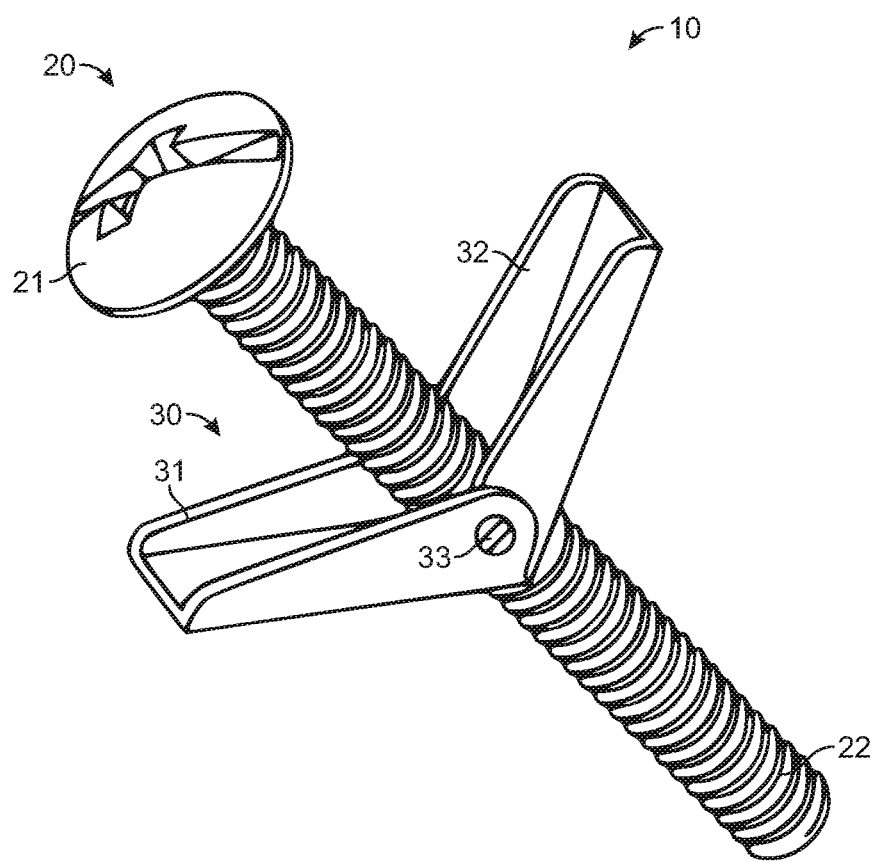
FIG. 1 illustrates an example toggle bolt according to aspects of the embodiments described herein.

In the context of wall anchors, FIG. 1 illustrates an example toggle bolt 10 according to aspects of the embodiments described herein. The toggle bolt 10 includes a bolt 20 and a toggle 30. The toggle bolt 10 is representative and not drawn to scale. Toggle bolts similar to the toggle bolt 10 are commercially available in a wide range of sizes and finishes. The toggle bolt catch embodiments described in detail below can be used with various types, styles, and sizes of toggle bolts.

As shown in FIG. 1, the bolt 20 includes a bolt head 21 attached to one end of a threaded rod 22. The toggle 30 includes a pair of toggle wings 31 and 32 that can pivot between open and closed positions about a pivot point 33. The threaded rod 22 is threaded through an eyelet integrated with the pivot point 33 in the toggle 30. A spring in the toggle 30 holds or biases the toggle wings 31 and 32 in an open configuration as shown in FIG. 1, but the toggle wings 31 and 32 can be compressed closer together around the threaded rod 22 as described in further detail below. Toggle bolts are commercially available in a wide range of sizes. Thus, the size and length of the bolt 20 can vary among various standard metric and imperial sizes, and the size of the toggle 30 can also vary.

Toggle bolts, such as the toggle bolt 10 shown in FIG. 1, are particularly useful (and may be the only suitable, commercially-available option) for securing relatively heavy loads to hollow walls formed using drywall and similar types of paneling. The toggle bolt 10, which is typically formed from steel (but can be formed from other metals) and finished with a zinc, can be particularly strong as compared to other types of anchors, particularly those formed from plastic. Further, the toggle wings 31 and 32 are larger and spread out considerably further from the threaded rod 22. Thus, when the toggle bolt 10 is installed, the toggle wings 31 and 32 can spread open against the paper backing of a sheet of drywall, for example, within a hollow wall, bracing and holding the toggle bolt 10 securely.

Figure 2A:
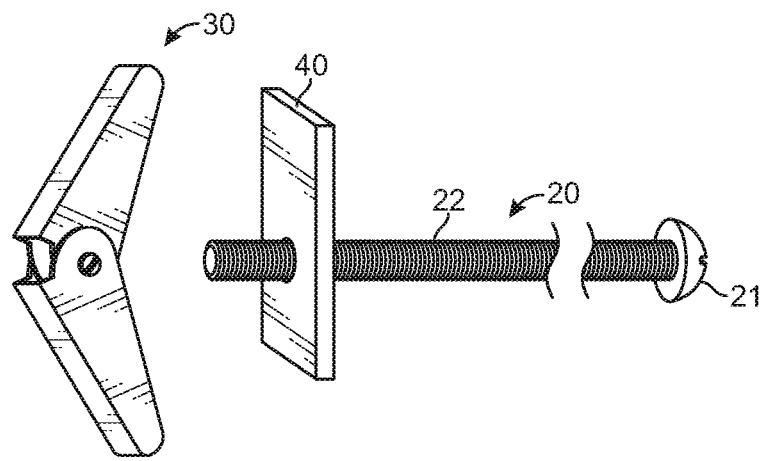
FIGS. 2A-2C illustrate example steps in the use of a toggle bolt to secure an item to a sheet of drywall according various embodiments described herein.
Figure 2B:
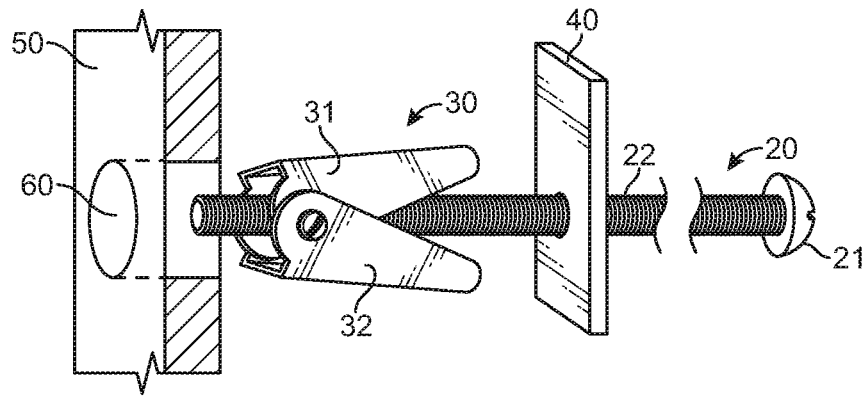
Figure 2C:
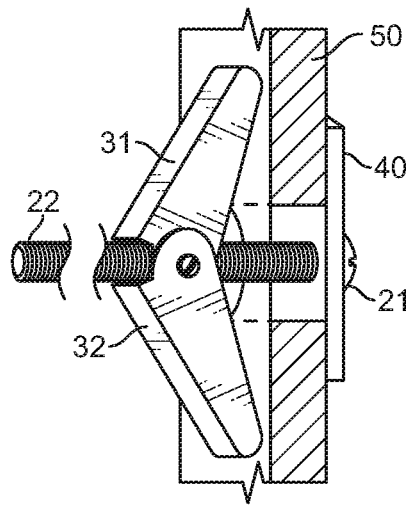

FIGS. 2A-2C illustrate example steps in the use of the toggle bolt 10 to secure an item 40 to a sheet of drywall 50. The item 40 is shown as a representative example of an item that can be secured to the drywall 50. A non-exhaustive list of the types of items that can be secured using the toggle bolt 10 includes frames, shelves, hooks, mirrors, and other items. Among other items and structures, the toggle bolt 10 can also be used to secure racks, tracks, or struts, such as UNITSTRUT®, upon which other items can be secured to.

As shown in FIG. 2A, the toggle 30 is removed from the bolt 20, the bolt 20 is passed through a hole or opening in the item 40, and the toggle 30 is threaded back onto the bolt 20. Referring to FIG. 2B, a hole 60 is formed through the drywall 50. The hole 60 can be formed in various ways, such as using a hole saw attached to a drill. The toggle wings 31 and 32 are then pressed together as shown, and the toggle 30 is passed through the hole 60. Once passed through the hole 60, the toggle wings 31 and 32 can expand back out and open behind the drywall 50. The bolt head 21 can then be rotated using a screwdriver or drill, for example, drawing the toggle 30 closer to the bolt head 21 as the threads on the threaded rod 22 rotate through the threaded eyelet in the toggle 30.

One problem with using the toggle 30 is that the toggle wings 31 and 32 can rotate freely within the open space behind the drywall 50 as the bolt head 21 is rotated. Particularly, if the toggle 30 is threaded upon the distal end of the threaded rod 22 (i.e., toward the end of the threaded rod 22 away from the bolt head 21), the toggle 30 is passed through the hole 60, and the item 40 and bolt head 21 are pressed against the outside of the drywall 50, the toggle wings 31 and 32 may extend in free space behind the drywall 50 without contact with the drywall 50 or any other structures. In that case, rotation of the bolt head 21 can cause the toggle 30 to rotate along with the threaded rod 22 due to friction between the threads on the threaded rod 22 and the threaded eyelet in the toggle 30.

To prevent the toggle wings 31 and 32 from rotating freely, it is generally necessary to insert the toggle 30 through the hole 60 and pull back on the item 40 and/or the bolt head 21 before rotating the bolt head 21. By pulling back on the item 40 and/or the bolt head 21, the toggle wings 31 and 32 can be pulled and secured against the inside of the drywall 50 to prevent them from rotating freely while the bolt head 21 is rotated. However, this requires the use of both hands, as one hand is needed to pull back on the item 40 and/or the bolt head 21 and another hand is needed to rotate the bolt head 21 using a screwdriver or drill.

In the context outlined above, a number of different toggle bolt catches for use with toggle bolts are described. One example toggle bolt catch includes a collar eyelet and a toggle catch. The collar eyelet includes a cylindrical ring having a central opening to allow the toggle of a toggle bolt to pass through. The collar eyelet also includes a flange that extends radially outward from the cylindrical ring. The toggle catch includes a stem that extends away from a back of the cylindrical ring.

In use, the toggle bolt catch is inserted through a hole formed in drywall, for example, with the stem extending in the open space behind the drywall and the collar eyelet being seated in the hole. A toggle bolt is inserted through the collar eyelet of the toggle bolt catch. In this configuration, when the bolt head of the toggle bolt is rotated, the toggle can rotate only until it contacts the stem, after which further rotation of the bolt head will draw the toggle of the toggle bolt toward the bolt head without additional rotation of the toggle. When using the toggle bolt catches described herein, it is no longer necessary pull back on the bolt head of a toggle bolt before rotating the bolt head to secure the toggle bolt. Thus, rather than using one hand to pull back on the bolt head of a toggle bolt and another hand to rotate the bolt head of the toggle bolt using a screwdriver or drill, only one hand is needed to rotate the bolt head. The other hand is left free to maintain balance, hold the item being secured, or any other purpose.

Figure 3B:
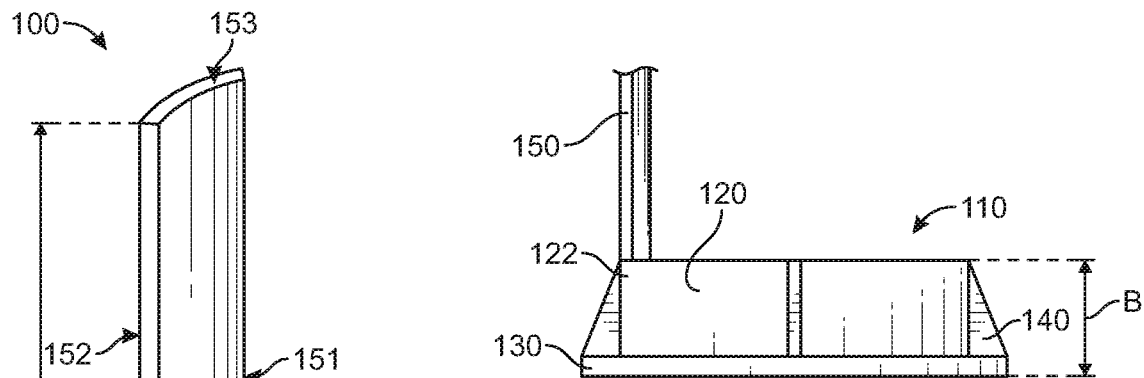
FIGS. 3A-3C illustrate posterior, side, and anterior views of an example toggle bolt catch, respectively, according various embodiments described herein.
Figures 3A, 3C:
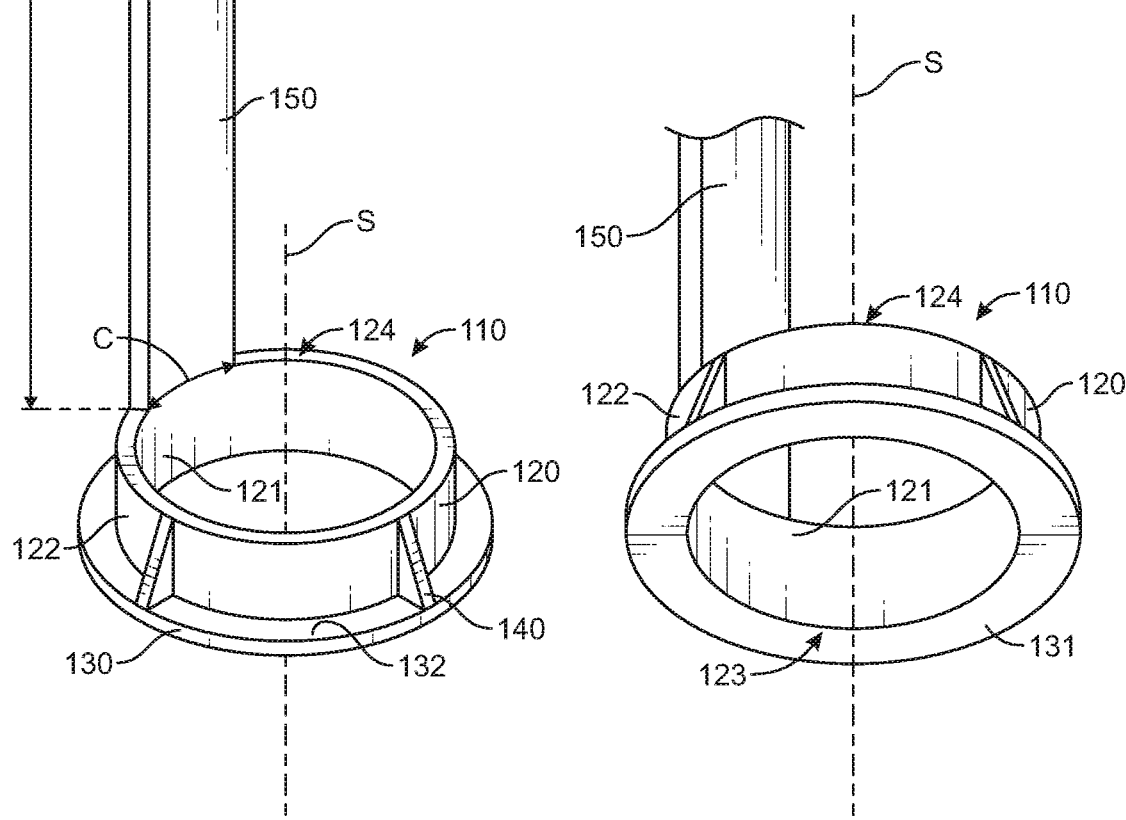

Turning to the embodiments, FIGS. 3A-3C illustrate posterior, side, and anterior views of an example toggle bolt catch 100, respectively. The toggle bolt catch 100 is provided as a representative example of a toggle bolt catch according to the concepts described herein. The toggle bolt catch 100 is not drawn to scale and can vary in size as compared to that shown. The toggle bolt catch 100 can be formed from any suitable material or materials, including plastic, wood, metal, or other materials and combinations thereof. The toggle bolt catch 100 can also be formed using any suitable manufacturing techniques, including injection molding, three-dimensional (3D) printing or related additive manufacturing techniques, subtractive manufacturing techniques, or other techniques. The toggle bolt catch 100 can be formed as one integral part or, in some cases, assembled from a number of different pieces.

Referring among FIGS. 3A-3C, the toggle bolt catch 100 includes a collar eyelet 110 and a stem 150. As described in further detail below with reference to FIGS. 8A-8C, the toggle bolt catch 100 can be inserted through a hole cut out from drywall, for example, or another type of paneling. The size of the hole can be selected so that the collar eyelet 110 will fit snugly within the hole, and example sizes of the collar eyelet 110 are described below with reference to FIGS. 4A-4C. The stem 150 can be inserted through the hole first, and the collar eyelet 110 can be placed to fit within the hole. Once the toggle bolt catch 100 is positioned within the hole, the toggle 30 of the toggle bolt 10 can be inserted through the hole and secured as described below.

The collar eyelet 110 includes a cylindrical ring 120 having an inner cylindrical surface 121, an outer cylindrical surface 122, an anterior circular rim 123, and a posterior circular rim 124. As shown in FIG. 3B, the cylindrical ring 120 extends a distance "B" from the anterior circular rim 123 to the posterior circular rim 124. The distance "B" can vary among the embodiments, and distances of one quarter of an inch (¼"), three eights of an inch (⅜"), and one half of an inch (½") are representative examples of the distance "B".

A central opening extends within the inner cylindrical surface 121 between the anterior circular rim 123 and the posterior circular rim 124 as shown. The central opening is sized to be large enough to allow the toggle 30 to pass through the central opening when the toggle 30 is collapsed (e.g., when the toggle wings 31 and 32 are compressed closer together around the threaded rod 22). The central opening is small enough, however, to prevent the toggle 30 from passing through the central opening when the toggle 30 is expanded open.

The collar eyelet 110 also includes a circular rim flange 130 that extends radially away or outward from the anterior circular rim 123. The circular rim flange 130 includes an anterior rim flange surface 131 and a posterior rim flange surface 132. As described with reference to FIGS. 8A-8C below, the posterior rim flange surface 132 of the circular rim flange 130 can come into contact with the outer-facing side of the drywall when inserted within the hole cut out from the drywall.

The collar eyelet 110 also includes a number of eyelet gussets 140 formed between the posterior rim flange surface 132 and the outer cylindrical surface 122. In the embodiment shown in FIGS. 3A-3C, the toggle bolt catch 100 includes four evenly-spaced eyelet gussets 140, although not all four of them are visible in the illustration. In other cases, the toggle bolt catch 100 can include one, two, three, or more eyelet gussets similar to the eyelet gussets 140, and the eyelet gussets can be evenly- or unevenly-spaced around the collar eyelet 110. As described in further detail below with reference to FIGS. 8A-8C, the eyelet gussets 140 can help to secure the collar eyelet 110 within a hole cut out from the drywall, for example, and help to prevent the toggle bolt catch 100 from twisting within the hole.

The toggle bolt catch 100 also includes a toggle catch. In the embodiment shown in FIGS. 3A-3C, the toggle catch includes the stem 150, formed as a minor arc, which extends away from a portion "C" of the posterior circular rim 124 and runs along an axis of symmetry "S" of the collar eyelet 110 to a first distance "A" from the posterior circular rim 124. The length "A" of the stem 150 can vary depending on the size of the toggle bolt being used with the toggle bolt catch 100, for example, or other relevant factors. Similarly, the portion "C" of the posterior circular rim 124 over which the stem 150 extends can vary.

The stem 150 has a first longitudinal edge 151, a second longitudinal edge 152, and a stem end edge 153. When the toggle bolt catch 100 is inserted through a hole in drywall and the toggle 30 of the toggle bolt 10 is inserted through the central opening of the toggle bolt catch 100, the toggle 30 can only rotate until it contacts the stem 150. After that contact, further rotation of the bolt head 21 will draw the toggle 30 toward the bolt head 21 without additional rotation of the toggle 30. The advantages of using the toggle bolt catch 100 are covered in greater detail below with reference to FIGS. 8A-8C.

Figure 4A:
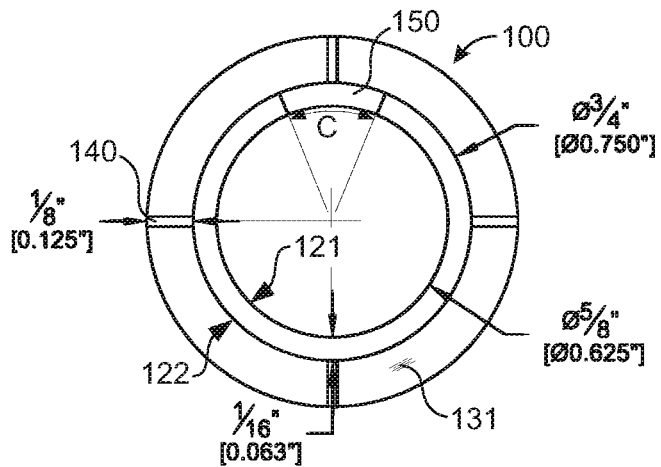
FIGS. 4A-4C illustrate example dimensions of toggle bolt catches of different sizes according various embodiments described herein.
Figure 4B:
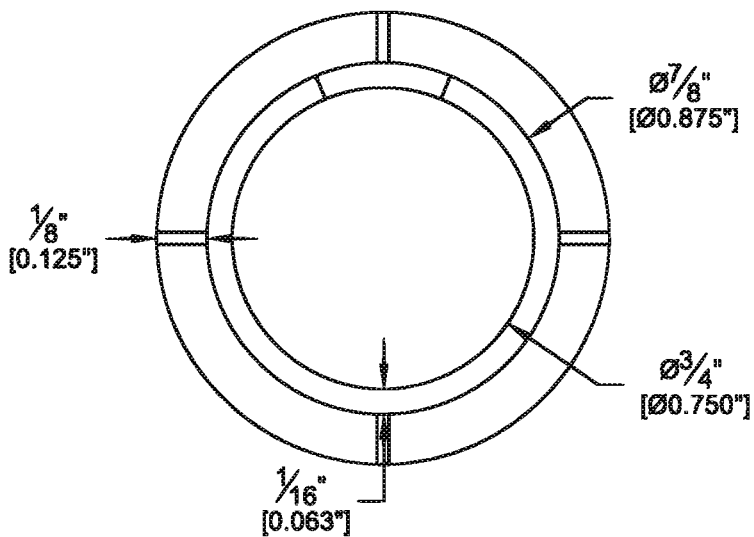
Figure 4C:
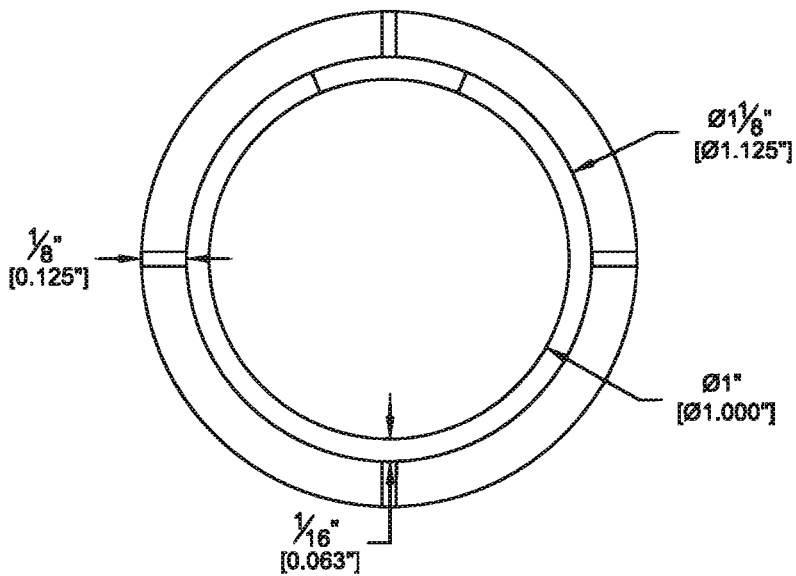

FIGS. 4A-4C illustrate example dimensions of toggle bolt catches of different sizes according various embodiments described herein. FIG. 4A illustrates a top down view of the toggle bolt catch 100 shown in FIGS. 3A-3C. As shown in that example, the central opening of the toggle bolt catch 100 has a radius of five eighths of an inch (⅝"). Further, the cylindrical ring 120 is one sixteenth of an inch (1/16") thick between the inner cylindrical surface 121 and the outer cylindrical surface 122, and the circular rim flange 130 extends one eighth of an inch (⅛") radially away from the outer cylindrical surface 122. Finally, the stem 150 extends from the portion "C" of the posterior circular rim 124. The portion "C" can extend from about one half to about two radians (or even to as much as 7C radians) along the posterior circular rim 124 (e.g., the circumference of the central opening of the toggle bolt catch 100) in various embodiments.

FIG. 4B illustrates a top down view of another toggle bolt catch. As shown in that example, the central opening has a radius of three quarters of an inch (¾"). The cylindrical ring is one sixteenth of an inch (1/16") thick between the inner cylindrical surface and the outer cylindrical surface, and the circular rim flange extends one eighth of an inch (⅛") radially away from the outer cylindrical surface. Finally, the stem can extend from about one half to about two radians (or even to as much as 7C radians) of the posterior circular rim.

FIG. 4C illustrates a top down view of still another toggle bolt catch. As shown in that example, the central opening has a radius of one inch (1"). The cylindrical ring is one sixteenth of an inch (1/16") thick between the inner cylindrical surface and the outer cylindrical surface, and the circular rim flange extends one eighth of an inch (⅛") radially away from the outer cylindrical surface. Finally, the stem can extend from about one half to about two radians (or even to as much as 7C radians) of the posterior circular rim.

The dimensions shown in FIGS. 4A-4C are provided as examples and are not intended to be exhaustive. The dimensions, among others, can be applied to any of the embodiments described herein. The sizes of the central openings can be tailored based on the size of the toggle being used for the application. Similarly, the circular rim flanges can extend any suitable distance radially away from the outer cylindrical surface of the cylindrical ring.

Figure 5A:
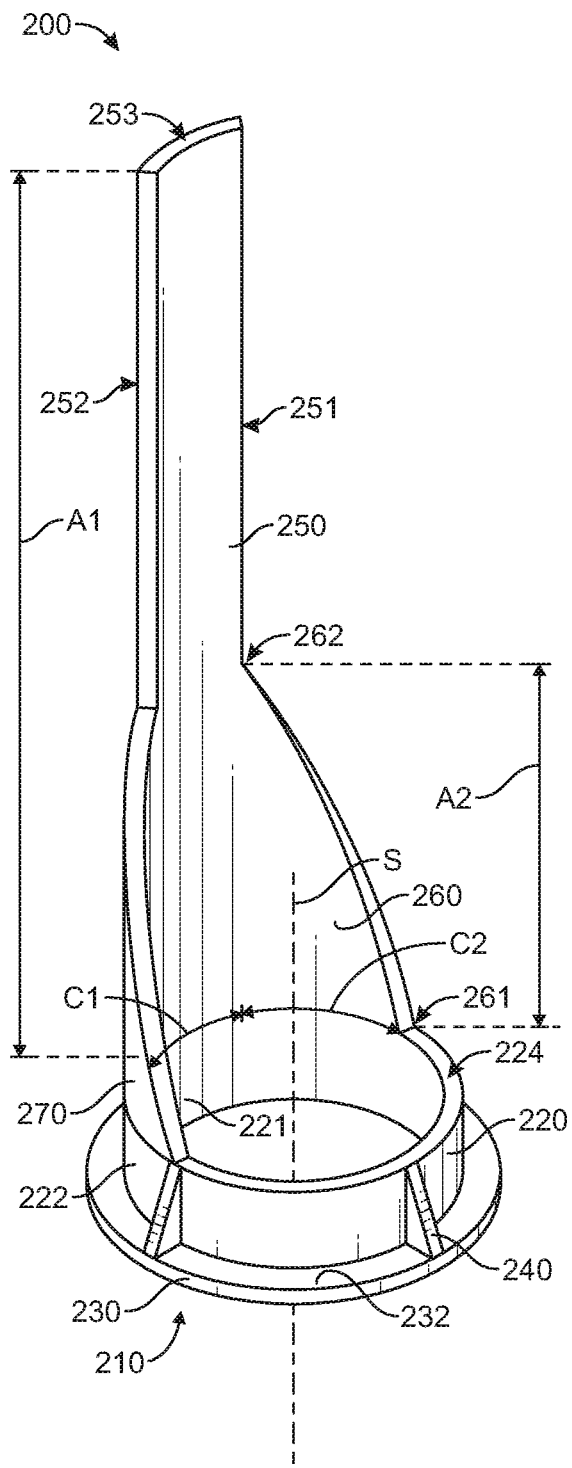
FIGS. 5A-5C illustrate posterior, side, and anterior views of another example toggle bolt catch, respectively, according various embodiments described herein.
Figure 5B:
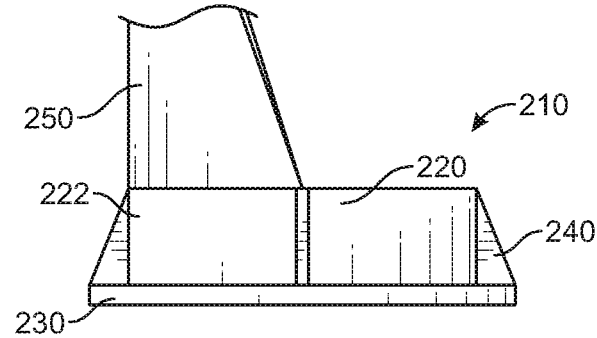
Figure 5C:
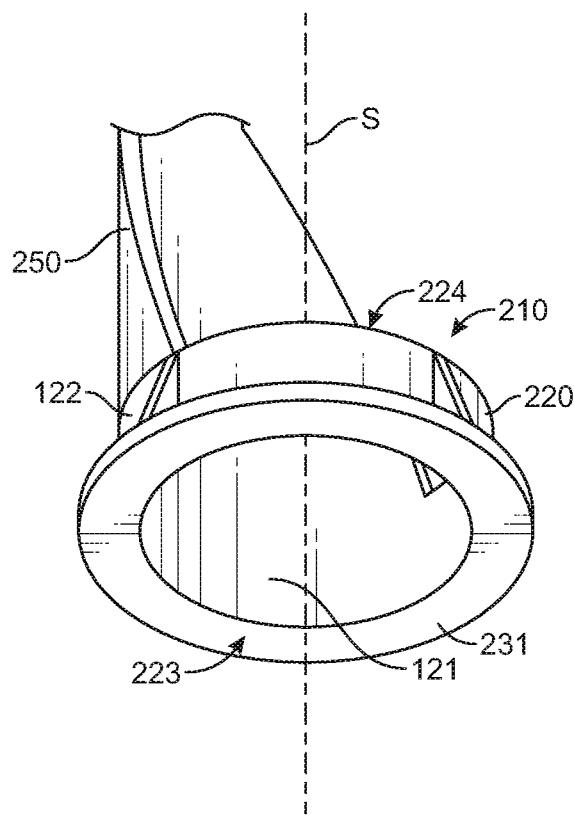

FIGS. 5A-5C illustrate posterior, side, and anterior views of another example toggle bolt catch 200, respectively, according various embodiments described herein. The toggle bolt catch 200 is provided as a representative example of a toggle bolt catch according to the concepts described herein. The toggle bolt catch 200 is not drawn to scale and can vary in size as compared to that shown. The toggle bolt catch 200 can be formed from any suitable material or materials, including plastic, wood, metal, or other suitable materials and combinations thereof and can be formed using any suitable manufacturing techniques.

Referring among FIGS. 5A-5C, the toggle bolt catch 200 includes a collar eyelet 210 and a stem 250. Similar to the way described below with reference to FIGS. 8A-8C, the toggle bolt catch 200 can be inserted through a hole cut out from drywall, for example, or another type of paneling. The size of the hole can be selected so that the collar eyelet 210 will fit snugly within the hole. The stem 250 can be inserted through the hole first, and the collar eyelet 210 can be placed to fit within the hole. Once the toggle bolt catch 200 is positioned within the hole, the toggle 30 of the toggle bolt 10 can be inserted through the hole and secured as described below.

The collar eyelet 210 includes a cylindrical ring 220 having an inner cylindrical surface 221, an outer cylindrical surface 222, an anterior circular rim 223, and a posterior circular rim 224. A central opening extends within the inner cylindrical surface 221 between the anterior circular rim 223 and the posterior circular rim 224 as shown. The central opening is sized to be large enough to allow the toggle 30 to pass through the central opening when the toggle 30 is collapsed (e.g., when the toggle wings 31 and 32 are compressed closer together around the threaded rod 22). The central opening is small enough, however, to prevent the toggle 30 from passing through the central opening when the toggle 30 is expanded open.

The collar eyelet 210 also includes a circular rim flange 230 that extends radially away or outward from the anterior circular rim 223. The circular rim flange 230 includes an anterior rim flange surface 231 and a posterior rim flange surface 232. The posterior rim flange surface 232 of the circular rim flange 230 can come into contact with the outer-facing side of drywall when inserted within the hole cut out from the drywall.

The collar eyelet 210 also includes a number of eyelet gussets 240 formed between the posterior rim flange surface 232 and the outer cylindrical surface 222. In the embodiment shown in FIGS. 5A-5C, the toggle bolt catch 200 includes four evenly-spaced eyelet gussets 240. In other cases, the toggle bolt catch 200 can include one, two, three, or more eyelet gussets similar to the eyelet gussets 240, and the eyelet gussets can be evenly- or unevenly-spaced around the collar eyelet 210. The eyelet gussets 240 can help to secure the collar eyelet 210 within the hole cut out from the drywall, for example, and help to prevent the toggle bolt catch 200 from twisting within the hole.

The toggle bolt catch 200 also includes toggle catch. In the embodiment shown in FIGS. 5A-5C, the toggle catch includes the stem 250, formed as a minor arc, that extends away from a first portion "C1" of the posterior circular rim 224 and runs along an axis of symmetry "S" of the collar eyelet 210 to a first distance "A1" from the posterior circular rim 224. The stem 250 has a first longitudinal edge 251, a second longitudinal edge 252, and a stem end edge 253.

The toggle catch also includes a stem gusset 260, formed as another minor arc, which extends away from a second portion "C2" of the posterior circular rim 224 and tapers down along the first longitudinal edge 251 of the stem 250. The stem gusset 260 tapers down along the edge 251 of the stem 250 (from the corner 261 to the corner 262) to a second distance "A2" from the posterior circular rim 224. As shown, the second distance "A2" is shorter than the first distance "A1." The toggle catch also includes another stem gusset 270 that extends away from a third portion of the posterior circular rim 224 and tapers down to the second distance "A2" from the posterior circular rim 224.

The stem gussets 260 and 270 can be relied upon to provide additional support to the stem 250. The stem gussets 260 and 270 can help to prevent the stem 250 from breaking away from the collar eyelet 210. In some cases, the toggle bolt catch 200 can include only one of the two stem gussets 260 and 270. In that case, one of the first longitudinal edge 251 or the second longitudinal edge 252 can extend straight down to the posterior circular rim 224.

When the toggle bolt catch 200 is inserted through a hole in drywall and the toggle 30 of the toggle bolt 10 is inserted through the central opening of the toggle bolt catch 200, the toggle 30 can only rotate until it contacts the stem 250 or one of the stem gussets 260 and 270, after which further rotation of the bolt head 21 will draw the toggle 30 toward the bolt head 21 without additional rotation of the toggle 30.

Figure 6A:
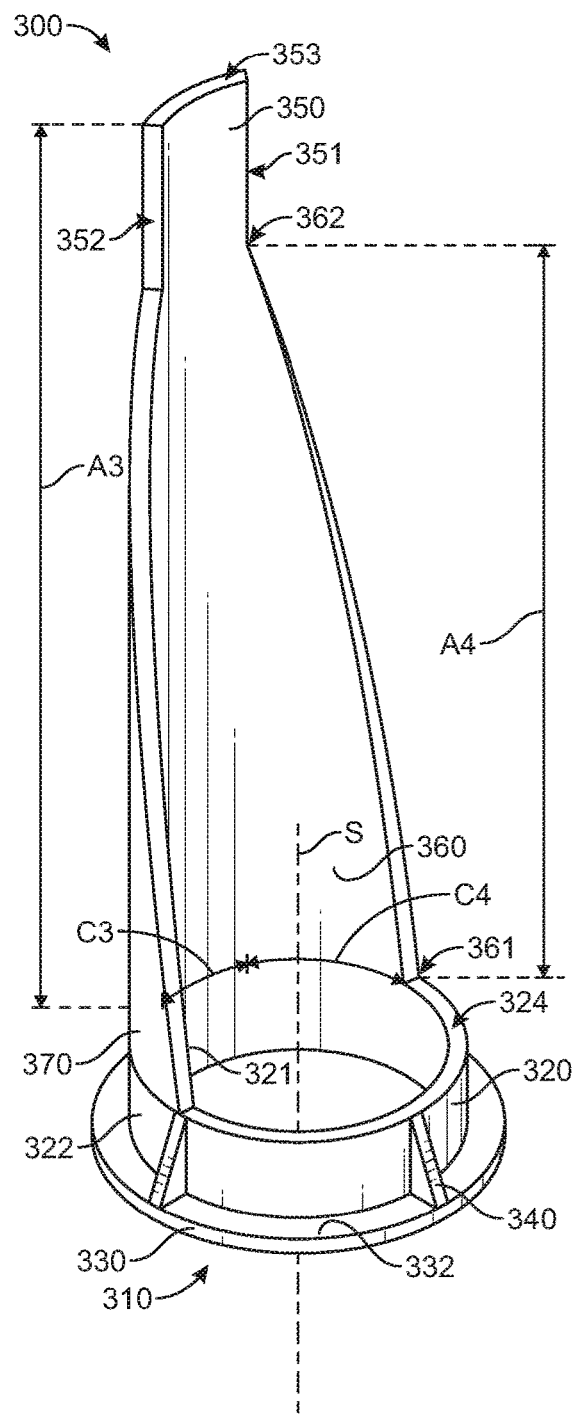
FIGS. 6A-6C illustrate posterior, side, and anterior views of another example toggle bolt catch, respectively, according various embodiments described herein.
Figure 6B:
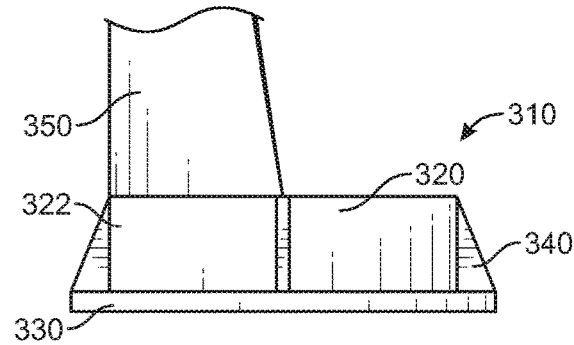
Figure 6C:
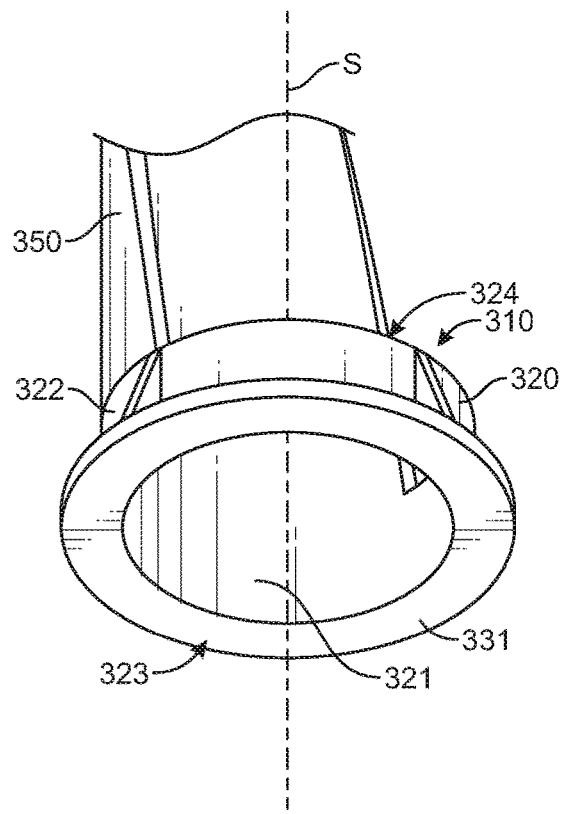

FIGS. 6A-6C illustrate posterior, side, and anterior views of another example toggle bolt catch 300, respectively. The toggle bolt catch 300 is provided as a representative example of a toggle bolt catch according to the concepts described herein. The toggle bolt catch 300 is not drawn to scale and can vary in size as compared to that shown. The toggle bolt catch 300 can be formed from any suitable material or materials, including plastic, wood, metal, or other suitable materials and combinations thereof and can be formed using any suitable manufacturing techniques.

Referring among FIGS. 6A-6C, the toggle bolt catch 300 includes a collar eyelet 310 and a stem 350. Similar to the way described below with reference to FIGS. 8A-8C, the toggle bolt catch 300 can be inserted through a hole cut out from drywall, for example, or another type of paneling. The size of the hole can be selected so that the collar eyelet 310 will fit snugly within the hole. The stem 350 can be inserted through the hole first, and the collar eyelet 310 can be placed to fit within the hole. Once the toggle bolt catch 300 is positioned within the hole, the toggle 30 of the toggle bolt 10 can be inserted through the hole and secured as described below.

The collar eyelet 310 includes a cylindrical ring 320 having an inner cylindrical surface 321, an outer cylindrical surface 322, an anterior circular rim 323, and a posterior circular rim 324. A central opening extends within the inner cylindrical surface 321 between the anterior circular rim 323 and the posterior circular rim 324 as shown. The central opening is sized to be large enough to allow the toggle 30 to pass through the central opening when the toggle 30 is collapsed (e.g., when the toggle wings 31 and 32 are compressed closer together around the threaded rod 22). The central opening is small enough, however, to prevent the toggle 30 from passing through the central opening when the toggle 30 is expanded open.

The collar eyelet 310 also includes a circular rim flange 330 that extends radially away or outward from the anterior circular rim 323. The circular rim flange 330 includes an anterior rim flange surface 331 and a posterior rim flange surface 332. The posterior rim flange surface 332 of the circular rim flange 330 can come into contact with the outer-facing side of drywall when inserted within the hole cut out from the drywall.

The collar eyelet 310 also includes a number of eyelet gussets 340 formed between the posterior rim flange surface 332 and the outer cylindrical surface 322. In the embodiment shown in FIGS. 6A-6C, the toggle bolt catch 300 includes four evenly-spaced eyelet gussets 340. In other cases, the toggle bolt catch 300 can include one, two, three, or more eyelet gussets similar to the eyelet gussets 340, and the eyelet gussets can be evenly- or unevenly-spaced around the collar eyelet 310. The eyelet gussets 340 can help to secure the collar eyelet 310 within the hole cut out from drywall, for example, and help to prevent the toggle bolt catch 300 from twisting within the hole.

The toggle bolt catch 300 also includes a toggle catch. In the embodiment shown in FIGS. 6A-6C, the toggle catch includes the stem 350, formed as a minor arc, that extends away from a first portion "C3" of the posterior circular rim 324 and runs along an axis of symmetry "S" of the collar eyelet 310 to a first distance "A3" from the posterior circular rim 324. The stem 350 has a first longitudinal edge 351, a second longitudinal edge 352, and a stem end edge 353.

As shown in FIGS. 6A-6C, the toggle catch also includes a stem gusset 360, formed as another minor arc, which extends away from a second portion "C4" of the posterior circular rim 324 and tapers down along the first longitudinal edge 351 of the stem 350. The stem gusset 360 tapers down along the edge 351 of the stem 350 (from the corner 361 to the corner 362) to a second distance "A4" from the posterior circular rim 324. As shown, the distance "A4" is shorter than the distance "A3." The toggle catch also includes another stem gusset 370 that extends away from a third portion of the posterior circular rim 324 and tapers down to the distance "A4" from the posterior circular rim 324.

The stem gussets 360 and 370 can be relied upon to provide additional support to the stem 350. In some cases, the toggle bolt catch 300 can include only one of the two stem gussets 360 and 370. In that case, one of the first longitudinal edge 351 or the second longitudinal edge 352 will extend straight down to the posterior circular rim 324.

When the toggle bolt catch 300 is inserted through a hole in drywall and the toggle 30 of the toggle bolt 10 is inserted through the central opening of the toggle bolt catch 300, the toggle 30 can only rotate until it contacts the stem 350 or one of the stem gussets 360 and 370, after which further rotation of the bolt head 21 will draw the toggle 30 toward the bolt head 21 without additional rotation of the toggle 30.

Figure 7:
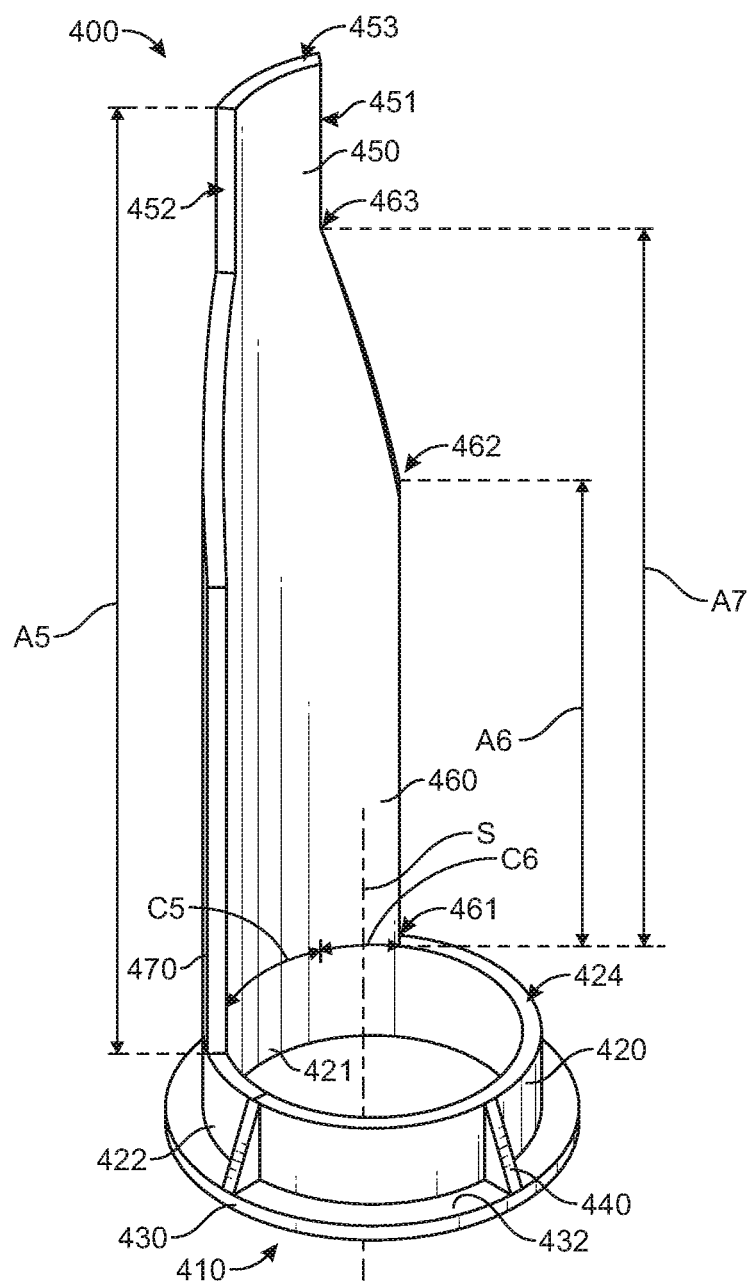
FIG. 7 illustrates another example toggle bolt catch according various embodiments described herein.

FIG. 7 illustrates another example toggle bolt catch 400 according various embodiments described herein. The toggle bolt catch 400 is provided as a representative example of a toggle bolt catch according to the concepts described herein. The toggle bolt catch 400 is not drawn to scale and can vary in size as compared to that shown. The toggle bolt catch 400 can be formed from any suitable material or materials, including plastic, wood, metal, or other suitable materials and combinations thereof and can be formed using any suitable manufacturing techniques.

The toggle bolt catch 400 includes a collar eyelet 410 and a stem 450. Similar to the way described below with reference to FIGS. 8A-8C, the toggle bolt catch 400 can be inserted through a hole cut out from drywall, for example, or another type of paneling. The size of the hole can be selected so that the collar eyelet 410 will fit snugly within the hole. The stem 450 can be inserted through the hole first, and the collar eyelet 410 can be placed to fit within the hole. Once the toggle bolt catch 400 is positioned within the hole, the toggle 30 of the toggle bolt 10 can be inserted through the hole and secured as described below.

The collar eyelet 410 includes a cylindrical ring 420 having an inner cylindrical surface 421, an outer cylindrical surface 422, an anterior circular rim (not shown or referenced), and a posterior circular rim 424. A central opening extends within the inner cylindrical surface 421. The central opening is sized to be large enough to allow the toggle 30 to pass through the central opening when the toggle 30 is collapsed (e.g., when the toggle wings 31 and 32 are compressed closer together around the threaded rod 22). The central opening is small enough, however, to prevent the toggle 30 from passing through the central opening when the toggle 30 is expanded open.

The collar eyelet 410 also includes a circular rim flange 430 that extends radially away or outward from the anterior circular rim. The circular rim flange 430 includes an anterior rim flange surface (not shown or referenced) and a posterior rim flange surface 432. The posterior rim flange surface 432 of the circular rim flange 430 can come into contact with the outer-facing side of drywall when inserted within the hole cut out from the drywall.

The collar eyelet 410 also includes a number of eyelet gussets 440 formed between the posterior rim flange surface 432 and the outer cylindrical surface 422. In the embodiment shown in FIG. 7, the toggle bolt catch 400 includes four evenly-spaced eyelet gussets 440. In other cases, the toggle bolt catch 400 can include one, two, three, or more eyelet gussets similar to the eyelet gussets 440, and the eyelet gussets can be evenly- or unevenly-spaced around the collar eyelet 410.

The toggle bolt catch 400 also includes a toggle catch. The toggle catch includes the stem 450, formed as a minor arc that extends away from a first portion "C5" of the posterior circular rim 424 and runs along an axis of symmetry "S" of the collar eyelet 410 to a first distance "A5" from the posterior circular rim 424. The stem 450 has a first longitudinal edge 451, a second longitudinal edge 452, and a stem end edge 453.

The toggle catch also includes a stem gusset 460, formed as another minor arc, which extends away from a second portion "C6" of the posterior circular rim 424. The stem gusset 460 extends a distance "A6" straight along the first longitudinal edge 451 from the corner 461 to the corner 462 and tapers down from the corner 462 along the first longitudinal edge 451 of the stem 450. The stem gusset 460 tapers down along the edge 451 of the stem 450 from the corner 462 to the corner 463 to a second distance "A7" from the posterior circular rim 424. As shown, the distance "A6" is shorter than the distance "A7," and the distance "A7" is shorter than the distance "A5." The toggle catch also includes another stem gusset 470 that extends away from a third portion of the posterior circular rim 424 and tapers down to the distance "A7" from the posterior circular rim 424. The stem gussets 460 and 470 can be relied upon to provide additional support to the stem 450. In some cases, the toggle bolt catch 400 can include only one of the two stem gussets 460 and 470.

Figure 8A:
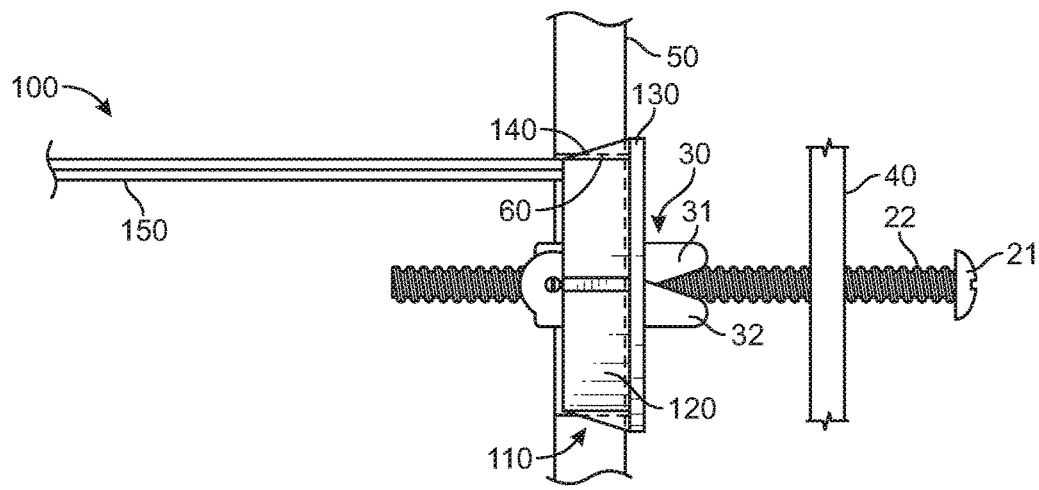
FIGS. 8A-8C illustrate an example of the use of a toggle bolt and toggle bolt catch to secure an item to a wall according various embodiments described herein.
Figure 8B:
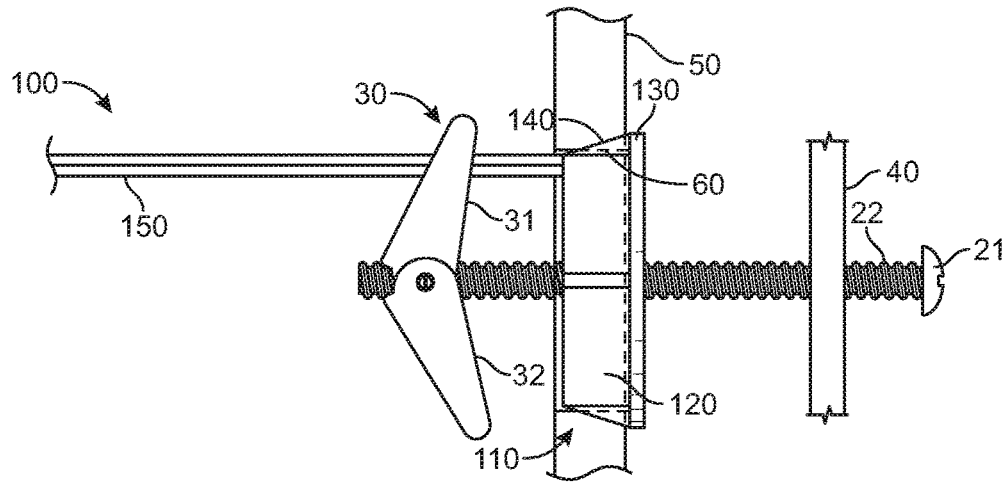
Figure 8C:
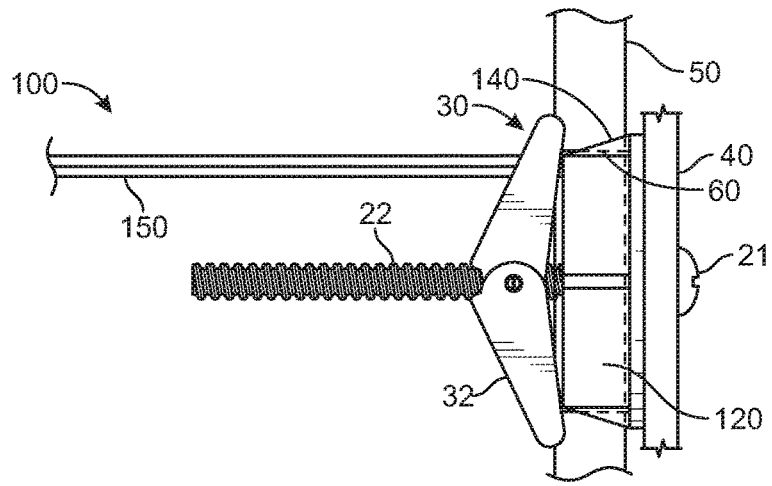

FIGS. 8A-8C illustrate an example of the use of the toggle bolt 10 and the toggle bolt catch 100 to secure an item 40 to the sheet of drywall 50. The sizes of the toggle bolt 10 and the toggle bolt catch 100 are not drawn to scale in FIGS. 8A-8C and, in practice, may vary in size individually or relative to each other.

As shown in FIG. 8A, a hole 60 is formed through the drywall 50. The hole 60 can be formed in various ways, such as using a hole saw attached to a drill. The toggle bolt catch 100 is then inserted within the hole 60. The stem 150 can be inserted through the hole 60 first, and the collar eyelet 110 can be seated within the hole 60. In this configuration, the stem 150 extends in the open space behind the drywall 50 and the collar eyelet 110 is seated in the hole 60. When the collar eyelet 110 is seated within the hole 60, the eyelet gussets 140 can press, dig, or cut into the edge of the drywall 50 where the hole 60 is formed. Next, the threaded rod 22 is inserted through a hole or opening in the item 40, and the toggle 30 is threaded back onto the threaded rod 22. The toggle 30 is then inserted through the collar eyelet 110 of the toggle bolt catch 100 as shown in FIG. 8A.

Turning to FIG. 8B, when the bolt head 21 of the toggle bolt 10 is rotated, the toggle 30 rotates only until it contacts the stem 150. After that contact, further rotation of the bolt head 21 will only draw the toggle 30 of the toggle bolt 10 toward the bolt head 21 without additional rotation of the toggle 30, as can be seen by comparing FIG. 8B with FIG. 8C. Because the eyelet gussets 140 are secured into the edge of the drywall 50 where the hole 60 is formed, the force of the toggle 30 against the stem 150 is unable to rotate the collar eyelet 110 within the hole 60.

When using the toggle bolt catch 100, it is no longer necessary pull back on the bolt head 21 of a toggle bolt 10 before rotating the bolt head 21. Thus, rather than using one hand to pull back on the bolt head 21 of a toggle bolt 10 and another hand to rotate the bolt head 21 using a screwdriver or drill, only one hand is needed to rotate the bolt head 21. The other hand is left free to maintain balance, hold the item being secured, or any other purpose.

In other aspects of the embodiments, the collar eyelet of a toggle bolt catch can include a break or opening in the cylindrical ring, to resulting in an open "C" shape. An open collar eyelet of that type can be formed slightly larger than the hole it is designed to be seated within and compressed to some extent before it is seated within the hole. Such an open collar eyelet can be helpful for expanding within holes cut with lower precision in size. Additionally, certain edges, such as edges of eyelet gussets and stem end edges, can be tapered or angled. An angled edge of am eyelet gusset can more easily press into drywall, for example.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. A toggle bolt catch for use with a toggle bolt comprising a bolt and a collapsible toggle, the toggle bolt catch comprising:
   a collar eyelet comprising:
      a cylindrical ring comprising an inner cylindrical surface, an outer cylindrical surface, an anterior circular rim, and a posterior circular rim, wherein a central opening extends within the inner cylindrical surface between the anterior circular rim and the posterior circular rim, the central opening being sized to allow the collapsible toggle, when collapsed, to pass through the central opening;
      a circular rim flange that extends radially outward from the anterior circular rim, the circular rim flange comprising an anterior rim flange surface and a posterior rim flange surface; and
      an eyelet gusset formed between the posterior rim flange surface and the outer cylindrical surface; and
   a toggle catch comprising:
      a minor arc stem that extends away from a first portion of the posterior circular rim along an axis of symmetry of the collar eyelet to a first distance from the posterior circular rim, the minor arc stem comprising two longitudinal edges and one stem end edge; and
      a stem gusset that extends away from a second portion of the posterior circular rim and tapers down along one of the two longitudinal edges of the minor arc stem.

2. The toggle bolt catch of claim 1, wherein:
   the first portion of the posterior circular rim extends a first circumferential length of the posterior circular rim; and
   the second portion of the posterior circular rim extends a second circumferential length of the posterior circular rim.

3. The toggle bolt catch of claim 1, wherein the stem gusset extends away from the second portion of the posterior circular rim and tapers down along the one of the two longitudinal edges of the minor arc stem to a second distance from the posterior circular rim, wherein the second distance is shorter than the first distance.

4. The toggle bolt catch of claim 1, wherein:
the stem gusset extends away from the second portion of the posterior circular rim and tapers down along the one of the two longitudinal edges of the minor arc stem from a second distance to a third distance from the posterior circular rim;
the second distance is shorter than the third distance; and
the third distance is shorter than the first distance.

5. The toggle bolt catch of claim 1, wherein:
the stem gusset comprises two stem gussets;
a first stem gusset of the two stem gussets extends away from the second portion of the posterior circular rim and tapers down along the one of the two longitudinal edges of the minor arc stem; and
a second stem gusset of the two stem gussets extends away from a third portion of the posterior circular rim and tapers down along another one of the two longitudinal edges of the minor arc stem.

6. The toggle bolt catch of claim 5, wherein:
the first portion of the posterior circular rim extends a first circumferential length of the posterior circular rim; and
the second portion of the posterior circular rim extends a second circumferential length of the posterior circular rim; and
the third portion of the posterior circular rim extends a third circumferential length of the posterior circular rim.

7. The toggle bolt catch of claim 6, wherein a total length of the first circumferential length, the second circumferential length, and the third circumferential length is about half of a circumferential length of the posterior circular rim.

8. The toggle bolt catch of claim 6, wherein a total length of the first circumferential length, the second circumferential length, and the third circumferential length is less than half of a circumferential length of the posterior circular rim.

9. A toggle bolt catch for use with a toggle bolt comprising a bolt and a collapsible toggle, the toggle bolt catch comprising:
a collar eyelet comprising:
a cylindrical ring having a central opening, the central opening being sized to allow the collapsible toggle, when collapsed, to pass through the central opening; and
a circular rim flange that extends radially outward from the cylindrical ring; and
a toggle catch comprising:
a minor arc stem that extends away from a first portion of the cylindrical ring along an axis of symmetry of the collar eyelet, wherein
the cylindrical ring comprises an inner cylindrical surface, an outer cylindrical surface, an anterior circular rim, and a posterior circular rim;
the central opening extends within the inner cylindrical surface between the anterior circular rim and the posterior circular rim;
the circular rim flange extends radially outward from the anterior circular rim;
the circular rim flange comprises an anterior rim flange surface and a posterior rim flange surface; and
the collar eyelet further comprises an eyelet gusset formed between the posterior rim flange surface and the outer cylindrical surface.

10. The toggle bolt catch of claim 9, wherein:
the circular rim flange extends radially outward from away from an anterior circular rim of the cylindrical ring;
the minor arc stem extends away from a first portion of a posterior circular rim of the cylindrical ring; and
the toggle catch further comprises a stem gusset that extends away from a second portion of the posterior circular rim and tapers down along a longitudinal edge of the minor arc stem.

11. The toggle bolt catch of claim 10, wherein:
the first portion of the posterior circular rim extends a first circumferential length of the posterior circular rim;
the second portion of the posterior circular rim extends a second circumferential length of the posterior circular rim; and
a total length of the first circumferential length and the second circumferential length is less than half of a circumferential length of the posterior circular rim.

12. The toggle bolt catch of claim 10, wherein:
the minor arc stem that extends away from the first portion of the cylindrical ring along the axis of symmetry of the collar eyelet to a first distance from the cylindrical ring; and
the stem gusset extends away from the second portion of the posterior circular rim and tapers down along the longitudinal edge of the minor arc stem to a second distance from the posterior circular rim, wherein the second distance is shorter than the first distance.

13. The toggle bolt catch of claim 12, wherein:
the stem gusset extends away from the second portion of the posterior circular rim and tapers down along the longitudinal edge of the minor arc stem from a second distance to a third distance from the posterior circular rim;
the second distance is shorter than the third distance; and
the third distance is shorter than the first distance.

14. The toggle bolt catch of claim 12, wherein:
the stem gusset comprises two stem gussets;
a first stem gusset of the two stem gussets extends away from the second portion of the posterior circular rim and tapers down along a first longitudinal edge of the minor arc stem; and
a second stem gusset of the two stem gussets extends away from a third portion of the posterior circular rim and tapers down along a second longitudinal edge of the minor arc stem.

15. The toggle bolt catch of claim 14, wherein:
the first portion of the posterior circular rim extends a first circumferential length of the posterior circular rim; and
the second portion of the posterior circular rim extends a second circumferential length of the posterior circular rim; and
the third portion of the posterior circular rim extends a third circumferential length of the posterior circular rim.

16. The toggle bolt catch of claim 15, wherein a total length of the first circumferential length, the second circumferential length, and the third circumferential length is less than half of a circumferential length of the posterior circular rim.

17. A toggle bolt catch, the toggle bolt catch comprising:
a collar eyelet comprising:
a cylindrical ring having a central opening; and
a circular rim flange that extends radially outward from the cylindrical ring; and a toggle catch comprising:
  a stem that extends away from a first portion of the cylindrical ring along an axis of symmetry of the collar eyelet, wherein
the cylindrical ring comprises an inner cylindrical surface, an outer cylindrical surface, an anterior circular rim, and a posterior circular rim;
the central opening extends within the inner cylindrical surface between the anterior circular rim and the posterior circular rim;
the circular rim flange extends radially outward from the anterior circular rim;
the circular rim flange comprises an anterior rim flange surface and a posterior rim flange surface;
the collar eyelet further comprises an eyelet gusset formed between the posterior rim flange surface and the outer cylindrical surface;
the circular rim flange extends radially outward from away from an anterior circular rim of the cylindrical ring;
the stem extends away from a first portion of a posterior circular rim of the cylindrical ring; and
the toggle catch further comprises a stem gusset that extends away from a second portion of the posterior circular rim and tapers down along a longitudinal edge of the stem.

18. The toggle bolt catch of claim 17, wherein:
the stem extends away from the first portion of the posterior circular rim along an axis of symmetry of the collar eyelet to a first distance from the posterior circular rim; and the stem gusset extends away from the second portion of the posterior circular rim and tapers down along the longitudinal edge of the stem to a second distance from the posterior circular rim; and the second distance is shorter than the first distance.

19. The toggle bolt catch of claim 17, wherein:

the stem extends away from the first portion of the posterior circular rim along an axis of symmetry of the collar eyelet to a first distance from the posterior circular rim;

the stem gusset extends away from the second portion of the posterior circular rim and tapers down along the longitudinal edge of the stem from a second distance to a third distance from the posterior circular rim;

the second distance is shorter than the third distance; and the third distance is shorter than the first distance.

20. The toggle bolt catch of claim 17, wherein:

the stem gusset comprises two stem gussets;

a first stem gusset of the two stem gussets extends away from the second portion of the posterior circular rim and tapers down along the longitudinal edge of the stem; and a second stem gusset of the two stem gussets extends away from a third portion of the posterior circular rim and tapers down along another longitudinal edge of the stem.

* * * * *